United States Patent [19]
Rodgers et al.

[11] Patent Number: 5,014,306
[45] Date of Patent: May 7, 1991

[54] VOICE AND DATA TELEPHONE COMMUNICATION SYSTEM AND METHOD

[75] Inventors: Donald E. Rodgers, Moorpark; Jacob Y. Chen, Canoga Park; Prafulla K. Padhi, Agoura, all of Calif.

[73] Assignee: Transtream, Inc., Agoura Hills, Calif.

[21] Appl. No.: 271,087

[22] Filed: Nov. 14, 1988

[51] Int. Cl.$^5$ .............................. H04M 1/00
[52] U.S. Cl. ........................ 379/407; 379/406; 370/32.1
[58] Field of Search ............... 379/406, 407, 408; 370/32.1

[56] References Cited

U.S. PATENT DOCUMENTS

| | | | |
|---|---|---|---|
| 3,700,810 | 10/1972 | Richeson, Jr. et al. | 379/407 |
| 3,783,194 | 1/1974 | Vilips et al. | 379/407 |
| 4,177,361 | 12/1979 | Birck | 379/408 |
| 4,352,962 | 10/1982 | LaMothe | 379/407 |
| 4,615,025 | 9/1986 | Vry | 379/407 |
| 4,658,420 | 4/1987 | Fukushi et al. | 379/407 |
| 4,881,221 | 11/1989 | Schroeder et al. | 379/408 |
| 4,885,755 | 12/1989 | Yoshida | 379/407 |

OTHER PUBLICATIONS

Tellabs, Inc., Technical Manual 76-822531 Rev. B, Dec. 2, 1987, pp. 1, 8 and 47.

Primary Examiner—Jin F. Ng
Assistant Examiner—Jhancy Augustus
Attorney, Agent, or Firm—Merchant, Gould, Smith, Edell, Welter and Schmidt

[57] ABSTRACT

In a digital switch high data rate data communications system, such as a "Datapath" system following the "T Link" protocol, to intercouple data terminal equipment operating at different data rates, voice messages are concurrently interleaved in transmitted bit streams. The system includes echo suppression modules for voice transmissions, but for data transmissions the echo suppression means is disabled in a channel by digital simulation of a monofrequency tone to open the channel. The preparatory sequence includes predetermined byte sequences which initiate the exchange of version identifier and parameter data prior to selection of a common data rate for intercommunication.

11 Claims, 3 Drawing Sheets

VOICE AND DATA TELEPHONE COMMUNICATION SYSTEM AND METHOD

BACKGROUND OF THE INVENTION

As telephone system technology is evolving toward a future high speed Integrated Services Digital Network (ISDN) for providing complete wideband interconnectivity, a current need remains for systems which can provide high-speed data links during the potentially long delay period before ISDN implementation. This need has been confronted in various ways by the AT&T "ACCUNET" Switched 56 Service, the AT&T "Dataphone" Digital Service, the prospective AT&T Circuit Switched Digital Capability (CSDC) and the "Datapath" system, offered by Northern Telecom, Inc. of Research Triangle Park, N.C. The last is an all digital data connection system based on digital circuit switches, special data units and line cards to enable data from digital sources to be transmitted at high rates via public digital telephone switches. It has been placed in widespread use because it not only enables high-speed transfers between modern data processing equipment but also provides advanced circuit-switched data services not only for central office switches but also for private branch exchanges (PBX's). It can also interface with the CSDC system with certain constraints. Being an all digital system, voice inputs have not been incorporated, even with pulse code modulation. This limitation is not acceptable for many present users and applications, since voice messages and signalling equipment are in such widespread current use. The ability to employ both types of messages means that the customer base could be significantly expanded and that service charges for high speed digital service could be drastically reduced.

The "Datapath" system is accessed by a combination of data units on the user's premises which interface to terminals on public and private networks, standard non-loaded cable pairs, and line cards at the channel banks. A wide variety of user equipment, with different data rates and interfaces, can be supported with these components. Despite disparities in data rates a common data transmission rate of 56 KBP/s (which plus clocking pulses gives a full rate of 64 KBP/s) is provided, with error correction data and synchronizing pulses being inserted where bandwidth is available. These functions are handled under a "T-link" protocol which also uses sequences of interchanged queries and responses to identify an acceptable frequency for both sender and receiver. Although dialing of a called number can be by keyboard at the terminal or data unit, or via a modem protocol, once the connection is made transmissions are entirely encoded and duplex in nature. Voice messages on this system would return back an echo from the called party's end that is unacceptable in modern systems, because of mismatches and feedback at the hybrid circuit and telephone handset.

The objective of communicating both voice and data signals by a common network was initially met by using low speed modems to express digital data in analog form for analog switching systems. The troublesome problem of voice echo was long ago overcome in analog networks by introducing echo suppression circuits. While signal echoes may be disturbing to humans they do not affect modem encoded data and may even be used for signal verification purposes. However, the echo suppression circuits act to block digital transmissions. Thus disabling features have been added to these echo suppression or canceller systems, and are activated upon initial transmission of a particular and continuous audio tone (i.e., 2100 $H_z$) for a given interval by the modem prior to data transmission. The modem approach and analog networks are however not only low speed but fundamentally inconsistent with the digital switches and PCM channel banks which are the current state of the art. They offer no answer to the need for employment of the full capabilities of a data connection system of the "Datapath" type with voice transmissions. In order to obtain the versatility inherent in the "T Link" protocol it is necessary to assure that voice messages are duplexed without echo but that there is no blockage of data messages, and further that the needed interchanges can take place to assure compatibility of data rates.

SUMMARY OF THE INVENTION

A data communications system using digital circuit switching incorporates multi-channel echo suppression circuits in the communications link, as in the central office switching equipment, together with data units at the calling and called facilities for interfacing between data terminal equipment and the central office switches. Individual channels in the echo-suppression circuits are disabled by applying a hex code sequence to simulate a selected cancellation signal of audio frequency. The disabling code is generated at the data units by replaceable application program circuits which may also provide a number of other digital signalling sequences. Thus, when a connection has been made and digital data is to be transmitted over a channel coupled to appropriate data unit, the data unit initiates a preparatory sequence prior to the commencement of full duplex interchanges. A predetermined pulse code modulated pattern of bytes is followed by repeated sequences of encoded bytes which simulate the echo suppression tone needed to disable echo suppression in that channel. Once this sequence is effective the channel is opened to data and the answering data unit returns a predetermined signal to indicate availability. Following a like response from the sending end the data units execute version identifier parameter interchange protocols which enable data terminal equipment at each end to communicate at an appropriate common rate. Consequently, voice signals and data can be concurrently transferred on the network in different channels while the full capability for digital connectivity is retained. The echo suppression feature is reintroduced in a channel whenever the channel is no longer busy.

BRIEF DESCRIPTION OF THE DRAWINGS

A better understanding of the invention may be had by reference to the following description taken in conjunction with the accompanying drawings, in which.

DETAILED DESCRIPTION OF THE INVENTION

Figure 1:
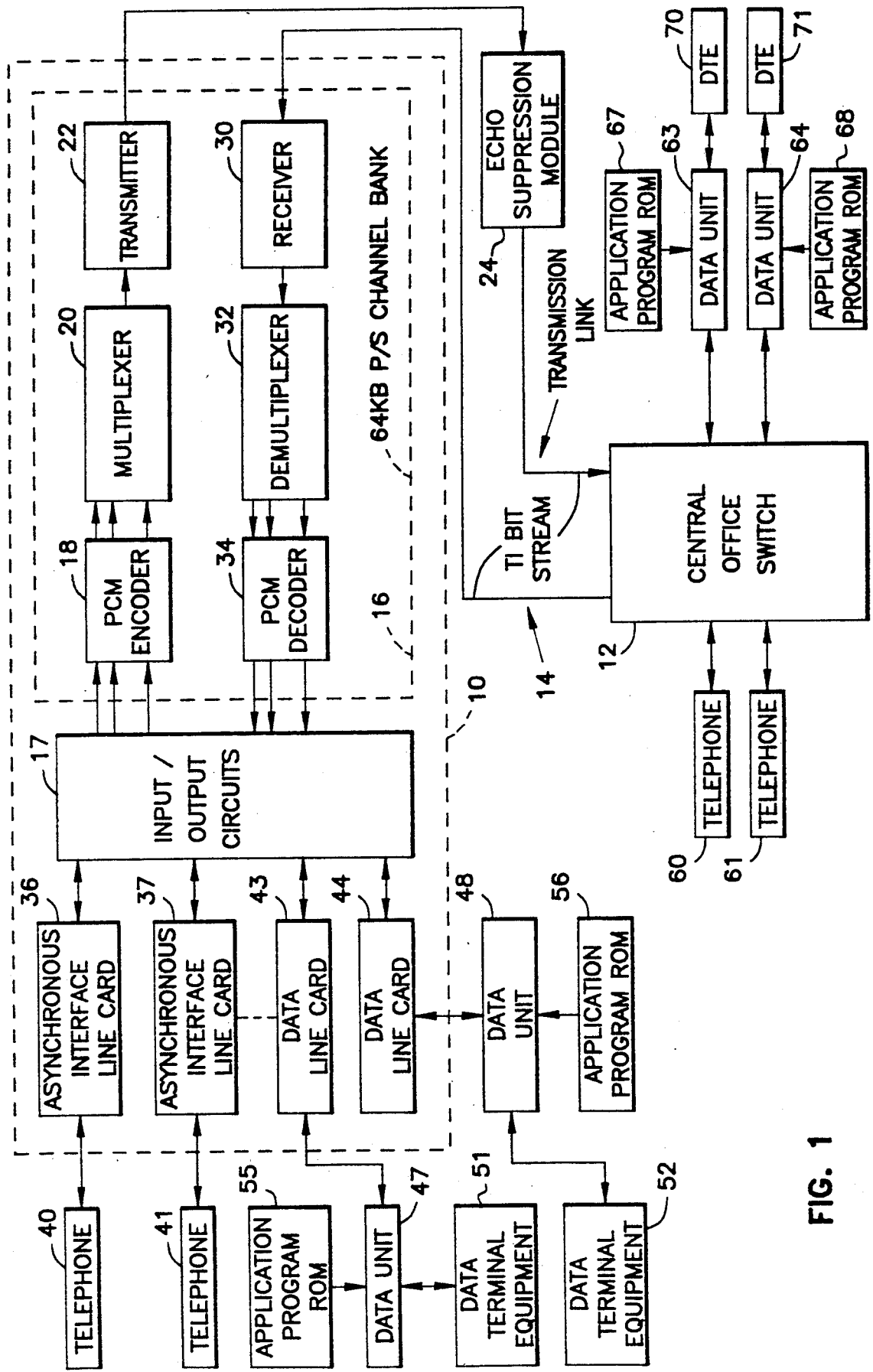
FIG. 1 is a block diagram of a system in accordance with the invention.

A telephone communication system in accordance with the invention, referring now to FIG. 1, is shown as exemplified by the principal elements used in the data channels of the "Datapath" system of Northern Telecom. As with other systems, a "T1" bit stream is generated at 1.544 MHz to transmit 24 channels of data at 8000 bytes/second each. Only the signalling and data transfer links of a system are shown in FIG. 1, for brevity and clarity, inasmuch as such systems are widely used and described in the literature. The combinations and methods of the invention can, however, alternatively be used with other high-speed data transmission systems where voice and also digital data are to be interchanged. In this example a multiplicity of sources are typically coupled to each central office system 10, 12 each of which may be a Northern Telecom "DMS-100". The central office systems 10, 12 are intercoupled by a microwave, fiber optic or other transmission link 14 having transmit and receive paths. Included in the central office switches 10, 12, as depicted for the switch 10 only, are 64 kbp/s channel banks 16 for generating and receiving the standard multiplexed 1.544 MHz "T1 bit stream". Input/output circuits 17 in the central office switch 10 provide interconnection between associated equipment and the channel bank 16.

In the transmit channel input voice signals are pulse code modulated in a PCM encoder 18 and applied in separate channels through a multiplexer 20, then a transmitter 22 within the channel bank 16 to an multichannel echo suppression module 24 in the outgoing line of the transmission link 14.

The multi-channel echo suppression module 24 with tone activated disabling feature may be any of a number of available commercial types. However, it is preferred in this example to use the Tellabs, Inc. "2531 Echo Canceller Module", which provides individual echo control for the channels of a digital carrier facility of the T1 type. This model operates with an end-path delay of up to 32 ms, but an alternative model 2531A provides a delay of up to 64 ms if this is desirable. The tone responsive disabler circuit responds to a continuously applied signal of between $-31$ and $0dBmO$, nominally $-6dBmO$ and of 300 ms duration ($\pm 100$ ms) in a detection band of 2060 to 2200 Hz (nominally 2100 $H_2$). Each channel incorporates guard bands and filtering outside the detection band, to prevent false operation. In responding to the activating signal, the echo suppression function is disabled and the channel becomes transparent to all transmissions. The disabling function terminates automatically with normal operation being restored whenever the channel is no longer busy, and whenever a continuous speech signal is present.

Received signals are detected from the line 14 by a receiver 30, distributed through the 24 channels by a demultiplexer 32 and analog voice signals in various channels are regenerated by a PCM decoder 34. The channel bank 16 is distinct from known high speed digital systems in incorporating the echo suppression module 20 in the transmit side.

The input/output functions of the central office switch 10 include line cards 36, 37, 43, 44 of the "Datapath" type as mentioned above. "Synchronous interface line cards" 36, 37 are used in voice message lines coupled to telephone 40, 41, while "data line cards" 43, 44 are coupled to data units 47, 48 which interface with data terminal equipment units 51, 52, respectively. Because the data units 47, 48 can, via the "T Link" protocol, coordinate transmission rates with different terminal equipment at a remote location, data interchange of rates of 1.2, 2.4, 4.8, 9.6 and 56 KBp/s is feasible.

The data units 47, 48, however, incorporate replaceable application program ROM cards 55, 56 which provide software code on command into the microprocessor of the data unit 47, 48 respectively. This is not only an extension of program memory but a versatile tool which enables different signalling formats to be accommodated and many other features not relevant to the present description to be added as well. The signal sequences that are generated in this example by the applications program ROMs 55, 56 may comprise:

(a) A preparatory sequence, for initializing purposes, of 32 bytes (b) a hex code PCM sequence of 8000 Hz for simulating, digitally, a 2100 Hz tone, at $-6dBmO$, namely:

FF99421AB39B2B1CA59E20229DA81-
B2E9ABA1950995019BA9A2E1BA89D22
209EA51C2B9BB31A4299FF19C29A331BAB9C2-
51EA0A21D289BAE1A3A99D0    19D0993A1AA-
E9B281DA2A01E259CAB1B339AC219FF994-
21AB39B2B1CA59E           20229DA81-
B2E9ABA1950995019BA9A2E1BA89D222-
09EA51C2B9BB31A4299    FF19C29A331BAB9C2-
51EA0A21D289BAE1A3A99D019D0993A1AA-
E9B281DA2 A011E259CAB1B339AC219

The 80 byte groups in this sequence are repeated a number of times in succession to give a selected total duration sufficient to result in disabling the echo suppression feature. Between 25 repetitions (250 MS) and 40 repetitions (400 MS) are typically sufficient to initiate the disabling function although 50 repetitions (500 MS) may be used in some systems.

It is evident that FIG. 1 is merely an example of a portion of a modern telephone data network, since many more lines and many different types of sources may be coupled to the central office switch. Private branch exchanges (PBX's), computers and remote channel banks will commonly be interconnected in, and many more transmission links will be used. The telephones 40, 41 and data terminal equipment units 51, 52 nevertheless adequately represent the basic dichotomy between voice and data transmission.

At the other end of the transmission link 14, the central office switch 12 is similarly coupled to telephones 60, 61 and data units 63, 64 illustrative of the two basic message sources. As previously described, the data units 63, 64 receive replaceable application program ROMs 67, 68 respectively, and interchange data with data terminal equipment 70, 71 respectively.

Figure 2:
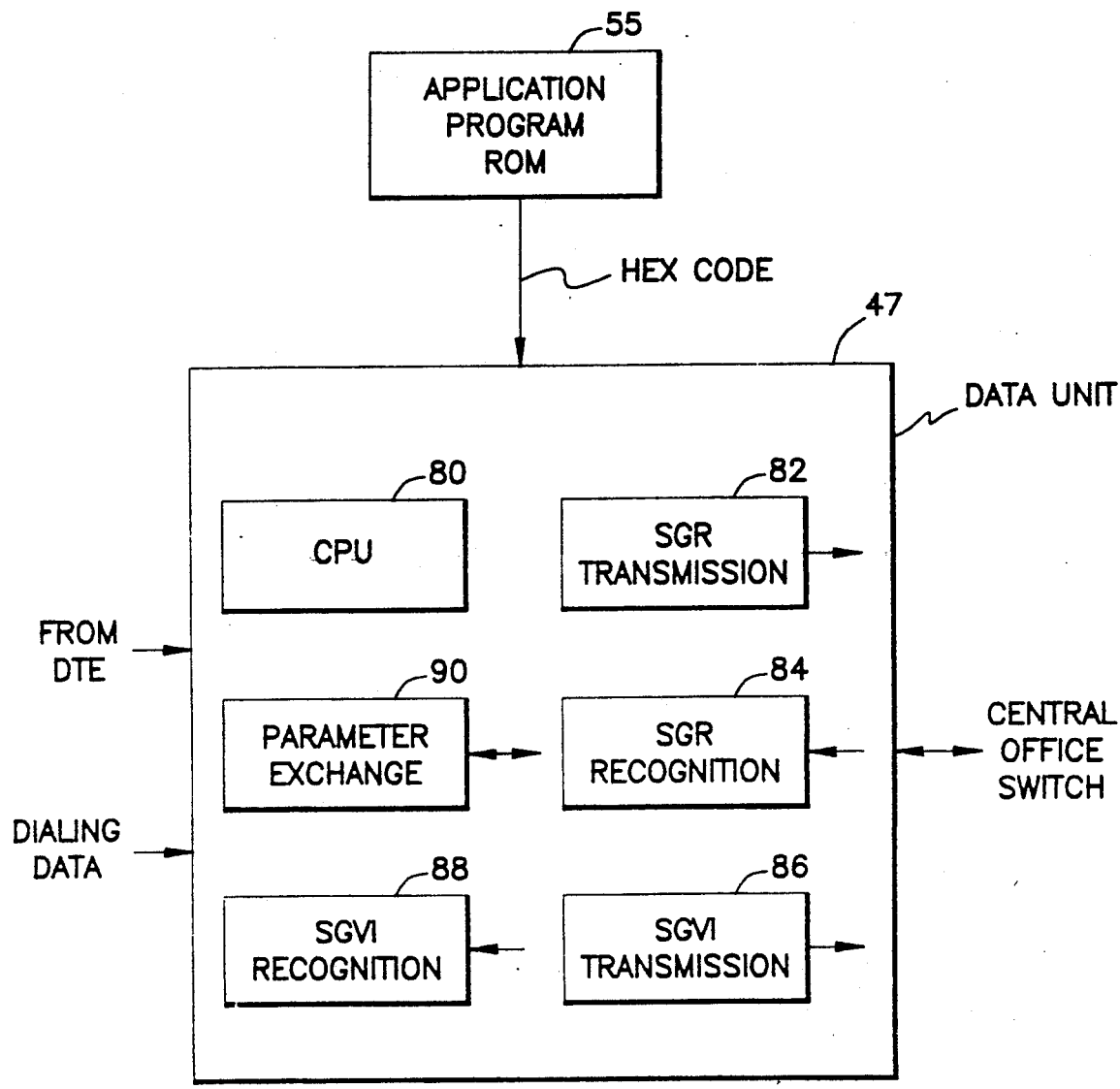
FIG. 2 is a generalized block diagram of relevant portions of a data unit that may be used in the system of FIG. 1.

As shown in generalized form in FIG. 2, a data unit 47 incorporates a number of operative features relevant to the present example. These are set out individually for clarity since the unit may be a special purpose circuit, for these features, of relative simplicity. It will be recognized, however, that the data unit is generally implemented by one or more microprocessors having internal memory as well as the application program ROM 55, and operating in different modes and states to provide the functions noted. The microprocessors are utilized to provide many more user and system related functions than are described in this example.

As shown in FIG. 2, a central processor unit 80 in the data unit 47 controls sequencing of different functional units once a request for data transmission is received from the associated data terminal equipment and the number to be called is transferred to the central office switch. When calling, the data unit first generates a SGR byte sequence with the hardware or software block 82, then follows with the hex code sequence derived from the program application ROM 55. When called the data unit may remain quiescent until SGR recognition block 84 is activated, or may remain quiescent for a fixed interval e.g. 3.5 seconds, the latter approach being used in this example. It then generates a SGVI sequence to signal operational readiness, at the block 86. The unit must also recognize a SGVI sequence at the block 88, following which the parameter exchange software or circuits 90 begin the complete interchange or handshaking routine, which comprises exchanging "version identifiers" and parameters.

Figure 3:
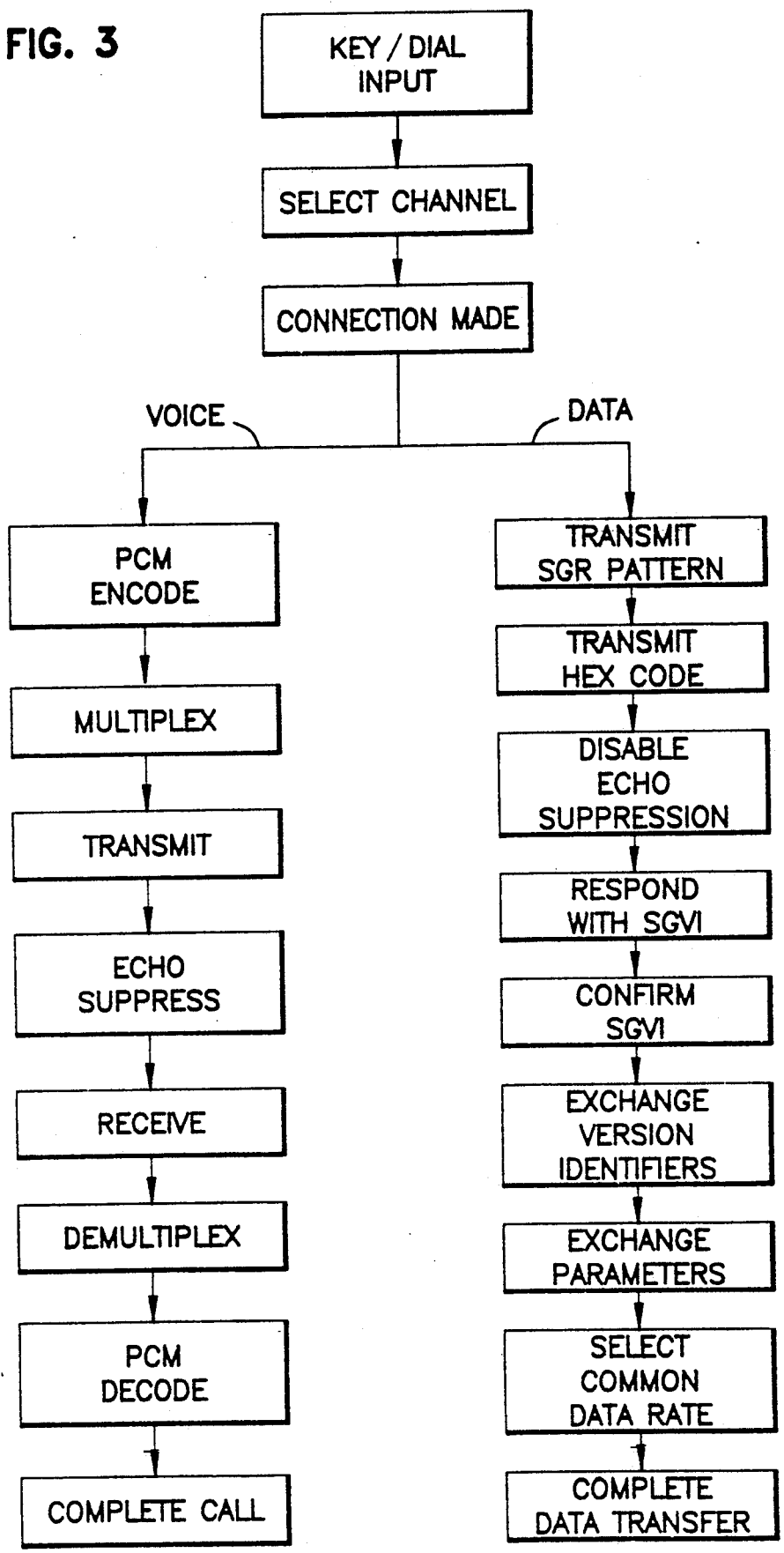
FIG. 3 is a flow chart of a sequence of signal interchanges used in the system of FIG. 1.

In the operation of the system of FIG. 1, referring now to FIG. 3 additionally, a calling party inputs the called number in one of the known alternative ways (e.g. keyboard, from storage, or by automatic dialing) from a telephone or digital source. The connection to the called party is made via the central office switches 10, 12 and intervening transmission link 14 in known fashion. Once the connection is made, message interchange in full duplex operation takes place in different modes for voice and data.

Voice messages from a given telephone, e.g., 40 at the calling end to another, e.g., telephone 60 at the called end, are directed via the Datapath line card 36 to the input/output circuits 17 in the channel bank 16. The circuits 17 route the voice analog signals to one of the 24 channels of the PCM encoder 18 where it is digitized, interleaved with other signals in the multiplexer 20 and transmitted via the transmitter 22 in T1 bit stream form to the echo suppression module 24. The echo suppression feature in the outgoing trunk channel is normally "on", so that a compensated signal is transferred in this voice channel of the T1 bit stream on the transmission link 14 to the receiving central office switch 12. The received signal, after demultiplexing and conversion back to analog form in the receiving central office switch 12 reaches the called telephone 60, where responsive transmission may begin immediately. Since the echo requires a complete feedback loop to be effectively received, use of echo suppression in only one part of the transmit/receive path is sufficient.

The message returned from the called party at the receiver 30 in the channel bank 16 is passed through the demultiplexer 32 into the appropriate one of 24 channels, then converted back to analog in the PCM decoder 34 and applied through the input/output circuits 17 to the telephone 40.

When digital data is being transferred, however, the presence of the echo suppression module 24 would normally block the signal in the transmission link 14, preventing communication, even to initiate an interchange protocol. Thus, for data to be transmitted from data terminal equipment such as DTE 51, the associated data unit 47 uses a stored sequence from the applications program ROM 55 to establish the conditions necessary for transmission before the DTE 57 can begin inputting its message at whatever the commonly acceptable rate will be.

The data unit 47 thus first initiates a preparatory digital sequence using two repetitive patterns. The first is a sequence of 32 bytes (called SGR's) of a given combination, transmitted at 8000 Hz. In some configurations it is preferred that the called data unit, e.g. 63, at the other end, detect the signal when received. In this case, the SGRs do not initially reach the called unit because of the action of the echo suppression module 24. (The digital sequences are not altered in the channel bank 16 by the encoder 18 since it operates only on analog inputs). In the present example, after the call is completed the called unit simply remains quiescent for a predetermined interval (e.g. 3.5 seconds to enable the echo suppression) to be disabled in the affected channel. To disable the echo suppression module 24 for the data channel, the second pattern is sent during the quiescent interval at the called data unit 63, comprising a software simulated tone generated by the hex code sequence given above and repeated without interruption at the 8000 Hz rate for typically about 300 milliseconds. The 320 bytes shown actually comprise four 80 byte sequences, the first two of which differ somewhat but the last two being a repetition of the first two. The effect, with respect to disabling echo suppression in the channel, is the same as a 2100 $H_2$ signal at $-6$ dBmO, for more than the specified 300 MS ($+/-$ 100 MS) duration. However, if disabling does not occur, the first, (SGR) and second (hex code) pattern can be repeated.

If the receiving data unit 63 is to be responsive to the reception the SGR bytes, it senses an uninterrupted sequence (e.g. 16) of the 32 SGR bytes, and this event unambiguously signifies that a digital transmission follows. Since a quiescent delay interval alone is normally used at the called unit, SGR recognition need not be used. In any event the data unit responds with a signalling code, here designated SGVI, which the calling data unit 47 accepts as an acknowledgment that echo suppression has been disabled and the link completed. The calling data unit 47 then transmits its own SGVI code. The two data units 47, 63 can then initiate the subsequent "version identifier" and parameter exchanges which comprise the handshaking sequences used in the "Datapath" "T-Link" protocol. When a common data rate and any other needed conditions have been established, digital data transfer can begin.

Thus voice and data can be interleaved in a high speed data network, with some channels carrying voice and using echo suppression while other channels carry data at varying rates but cancelling echo suppression. The flexibility this adds to network capability greatly expands the potential user base and permits substantial reductions in service costs for digital networks.

While various modifications and alternatives have been mentioned above it will be appreciated that the invention is not limited thereto but encompasses all forms and variations in accordance with the appended claims.

What is claimed is:

1. A digital communications network including digital switch systems incorporating channel banks providing multiple channels for multiplexing encoded messages in transmitting channels from voice and data devices into a high data rate bit stream, and demultiplexing a received high data rate bit stream into separate receiving channels for the voice and data devices, comprising:

encoder means in the transmitting channels of the channel banks for converting inputted voice signals to a pulse modulated code;

echo suppression means responsive to transmitted messages for suppressing echos in voice transmissions between calling and called parties, the echo suppression means including means operative in the individual channels and responsive to a predetermined analog signal for disabling the echo suppression function; and data units coupling the data devices to the channel banks, the data units being responsive to the readiness of associated data devices to initiate data transmissions to undertake preparatory echo suppression sequences, wherein the data units include means for transmitting repetitive digital patterns simulative of a predetermined analog signal to disable the echo suppression function in the channel prior to the data transmission, and means for exchanging preparatory data to establish a common data transfer rate.

2. A network as set forth in claim 1 above, wherein the data units include means for generating, in the preparatory sequence, a predetermined byte sequence and the repetitive digital pattern as a hex code sequence.

3. A network as set forth in claim 2 above, wherein the data devices operate at different data rates, and wherein the data units include means responsive to the making of a call connection for interchanging initial signalling codes preparatory to initializing exchanges to establish a common data transfer rate.

4. A network as set forth in claim 3 above, wherein the predetermined analog signal is a monofrequency signal maintained for a predetermined interval, wherein the predetermined byte sequence is a fixed sequence of bytes of predetermined number and the called data unit remains quiescent for a predetermined interval after a call connection is made for sending an initial signal code.

5. A network as set forth in claim 4 above, wherein the data units further include means for exchanging version identifier data and parameter data to establish a common data rate after the initial signalling codes have been interchanged.

6. A network as set forth in claim 5 above, wherein the predetermined byte sequence is of 32 bytes, the predetermined analog signal is an approximately 2100 $H_2$ signal for 300 M.S., and the hex code sequence is a repetition of 80 byte groupings for approximately 250–500 MS at 8000 $H_2$.

7. A network as set forth in claim 6 above, wherein the digital switch systems and data units comprise a "Datapath" type of system having "T-Link" protocol between the data units.

8. The method of transmitting both voice and data through multiple channels in a digital communication network including echo suppression circuits in the network, the echo suppression circuits including signal responsive disabling means comprising the steps of:

transmitting a block of digitally varying preparatory signals prior to any digital data in the channels to activate the disabling means in the echo suppression circuits, including transmitting a predetermined byte sequence and a software generated encoded simulation of a disabling signal for the disabling means, including simulating a continuous tone by a software generated sequence of hex code;

transmitting voice signals in other channels while using echo suppression;

transmitting signalling data for version and parameter interchange after cancellation of echo suppression in the digital channel;

returning the echo suppression circuits to enabled status after the termination of digital data transmission; and configuring the echo suppression circuits such that the echo suppression circuits are normally on, and wherein the system interconnects data devices which may have different data rates.

9. The method of claim 8 above, wherein the voice signals are interleaved in encoded form with data signals for transmission and reception, with echoes in voice channels being suppressed and echoes in data channels not being suppressed.

10. The method of claim 9 above, further including the step of interchanging version identifier and parameter information between calling and called parties to establish a common data rate for transmission.

11. An interface unit for use in conjunction with a network using a "T-Link" protocol in a "Datapath" configuration and having voice message input/output devices and data terminal equiment input/output devices operable at different data transfer rates, the network including a plurality of signal channels the echo suppression means for at least some of the signal channels, the echo suppression means for individual channels being normally "on" and disabled by an applied analog signal, the interface unit comprising:

means responsive to a first associated data terminal device for generating preparatory signal sequences for disabling the echo suppression means in a signal channel once a call connection has been made;

means for exchanging signalling codes with at least a second data terminal device once the echo suppression means has been disabled in the signal channel; and means for exchanging version identifier and parameter data between the first and second data terminal devices in accordance with the "T-Link" protocol once the signalling codes have been exchanged, to establish a common data rate for data transfer.

* * * * *